US011085873B2

(12) United States Patent
Lautenschläger et al.

(10) Patent No.: US 11,085,873 B2
(45) Date of Patent: Aug. 10, 2021

(54) SPECTROMETER HAVING A DISCHARGE LAMP WITH A PLURALITY OF BEAM PATHS

(71) Applicants: Mikrowellen Labor Technik AG, Heerbrugg (CH); Milestone S.r.l., Sorisole (IT)

(72) Inventors: Werner Lautenschläger, Heerbrugg (CH); Jens Lautenschläger, Heerbrugg (CH)

(73) Assignees: Mikrowellen Labor Technik AG, Heerbrugg (CH); Milestone S.r.L., Sorisole (IT)

( * ) Notice: Subject to any disclaimer, the term of this patent is extended or adjusted under 35 U.S.C. 154(b) by 0 days.

(21) Appl. No.: 16/348,684

(22) PCT Filed: Nov. 10, 2017

(86) PCT No.: PCT/EP2017/078866
§ 371 (c)(1),
(2) Date: Aug. 29, 2019

(87) PCT Pub. No.: WO2018/087279
PCT Pub. Date: May 17, 2018

(65) Prior Publication Data
US 2019/0391072 A1 Dec. 26, 2019

(30) Foreign Application Priority Data

Nov. 11, 2016 (DE) .................... 20 2016 106 325.6
Nov. 8, 2017 (DE) .................... 20 2017 106 764.5

(51) Int. Cl.
*G01N 21/31* (2006.01)
*G01J 3/42* (2006.01)
(Continued)

(52) U.S. Cl.
CPC ............... *G01N 21/31* (2013.01); *G01J 3/18* (2013.01); *G01J 3/42* (2013.01); *H01J 61/06* (2013.01); *G01N 2201/061* (2013.01)

(58) Field of Classification Search
CPC ..... G01N 21/31; G01N 2201/061; G01J 3/18; G01J 3/42; H01J 61/06
See application file for complete search history.

(56) References Cited

U.S. PATENT DOCUMENTS

| 4,523,096 A * | 6/1985 | Yasuda ................. G01N 21/64 250/373 |
| 5,214,593 A * | 5/1993 | Magnussen, Jr. .... G01N 21/274 356/436 |
| 2018/0238794 A1* | 8/2018 | Kangas ................... G01J 3/32 |

FOREIGN PATENT DOCUMENTS

| WO | 2006017644 A2 | 2/2006 | |
| WO | WO-2006017644 A2 * | 2/2006 | ............. G01N 21/64 |

OTHER PUBLICATIONS

International Search Report and Written Opinion issued in connection with the corresponding International Application No. PCT/EP2017/078866 dated Jan. 22, 2018.

* cited by examiner

*Primary Examiner* — Jamil Ahmed
(74) *Attorney, Agent, or Firm* — The H.T. Than Law Group

(57) ABSTRACT

The present invention relates a spectrometer (1) having a lamp (2) that extends in substantially tubular fashion for the purposes of forming a light emission zone (3) that extends in the direction of the tubular extent and between two points to the end of emitting a first light beam (L1) and a second light beam (L2) that have the same origin on the light emission zone (3), a sample container (6) that is arranged in
(Continued)

the beam path of the first light beam (L1) for receiving a sample to be measured, a first detection apparatus (D1) that is arranged in the direction of the first light beam (L1) for quantitative and/or qualitative determination of the sample to be measured in the sample container (6) on the basis of an interaction between the sample to be measured and the first light beam (L1), and a second detection apparatus (D2) that is arranged in the direction of the second light beam (L2) for the purposes of referencing the quantitative and/are qualitative determination, on the basis of the second light beam (L2), of the sample to be measured. The invention further relates to a spectrometer (1') having a lamp (2) that extends in substantially tubular fashion for the purposes of emitting at least two light beams (L1, L3), respectively one sample container (6, 16) arranged in the beam path of each light beam (L1, L3) for the purposes of receiving a sample to be measured, and a detection apparatus (D1, D3) that is arranged in the direction of each light beam (L1, L3) for the purposes of quantitative and/or qualitative determination of the sample to be measured in the respective sample container (6, 16) on the basis of an interaction between the sample to be measured and the respective light beam (L1, L3).

21 Claims, 4 Drawing Sheets

(51) Int. Cl.
    *G01J 3/18*     (2006.01)
    *H01J 61/06*     (2006.01)

SPECTROMETER HAVING A DISCHARGE LAMP WITH A PLURALITY OF BEAM PATHS

The invention relates to a spectrometer for the quantitative and/or qualitative determination of a sample.

Spectrometers are known from the prior art. In this case, the traditional two-beam technique is known, in particular, in which semitransparent mirrors are used. An exemplary arrangement in this respect is shown in FIG. 1. In the traditional two-beam technique, a light beam emanating from a light source is split into two independent light beams by a first semitransparent mirror. The first light beam is guided by means of the semitransparent mirror through a measuring cell (cuvette (cuv.) 1) containing a sample to be measured, and the second light beam is deflected at a further mirror in such a way that it is guided through a reference cell (cuv. 2). Both light beams are deflected again by further mirrors or semitransparent mirrors in order subsequently to pass through a monochromator and finally onto a detector or to be combined again upstream of the monochromator. The first light beam interacts with the measuring cell or with the sample contained in the measuring cell, wherein this interaction is imaged by the detector and the monochromator. The reference cell, which contains a reference liquid, serves here for referencing the measurement of the sample, as a result of which, in particular a matrix in the reference region is intended to be subtracted and a lamp fluctuation is also intended largely to be compensated for. For the measurement and referencing, alternately the beam is guided through the measuring cell and the beam is guided through the reference cell, i.e. the light beams of the respective cells reach the detector and the monochromator one after another. In the case of this arrangement having static components, i.e. the semitransparent and normal mirrors generally more than 75% of the energy, in particular of the light energy, is lost. At the same time, the reference channel, i.e. the path from the light source via the reference cell toward the detector and monochromator, and the sample channel, i.e. the path from the light source via the measuring cell toward the detector and monochromator, have to be momentarily interrupted for differentiation. This momentary interruption can be effected for example by means of a chopper or a beam switcher. Instead of the semitransparent mirrors, rotating mirrors could also be used in the prior art, said rotating mirrors respectively switching over the two beams. A further possibility from the prior art may also be a so-called saw-tooth roof with 90% mirror splitters. Embodiments which carry out a diffraction at prism switches and the like are likewise known from the prior art.

Consequently, for the devices known from the prior art, it is evident that light and energy are lost as a result of the reflective parts, and the alignment of the channels is very complex. Last but not least, all these devices known from the prior art are also associated with a high manual and optical outlay—the provision of additional lenses, in particular, should be noted in this context.

The invention is therefore based on the object of providing a spectrometer which in particular operates with greater energy efficiency and additionally reduces the manual and optical outlay for the measurement. In particular, the intention is also to eliminate lamp drift, i.e. a power loss and/or fluctuation of the lamp or the light source.

The object is achieved according to the invention by means of the features of the independent claims. The dependent claims referring back thereto relate to advantageous developments.

A spectrometer according to the invention in accordance with a first aspect of the invention comprises a lamp extending in substantially tubular fashion for the purpose of forming a light emission zone extending in the direction of the tubular extent and between two points for the purpose of emitting a first light beam and a second light beam having an identical origin on the light emission zone. The spectrometer additionally comprises a sample container for receiving a sample to be measured said sample container being arranged in the beam path of the first light beam. In the direction of the first light beam, provision is made of a first detection device for the quantitative and/or qualitative determination of the sample to be measured in the sample container on the basis of an interaction between the sample to be measured and the first light beam. In the direction of the second light beam, provision is made of a second detection device for referencing the quantitative and/or qualitative determination of the sample to be measured on the basis of the second light beam.

In the context of this invention, a light emission zone is understood to mean a two- or three-dimensional region (e.g. a light plasma embodied in substantially cylindrical fashion) which is able to emit light of varying wavelength. Start and end points of said region here are the two points mentioned above.

In the context of the invention, a light beam is understood to mean in particular focused light of varying wavelength, that is to say in other words white light, in particular. In this case, the substantially equidirectional extent of the respective light beams is the respective beam path, wherein the beam path in turn has a preferably defined direction of extent.

In the context of the invention, an "origin on the light emission zone" is understood to mean that point from which a light beam can originate; that is to say e.g. the point/region at which the light beam leaves the light emission zone. In this case, "identical" is understood in particular such that the light emission zone has identical properties, i.e. in particular the same brightness, at that "identical" point. In the case of a light plasma as light emission zone this occurs e.g. at regions of the light emission zone which leave the latter at an identical position between the points or at an identical distance from the points preferably at an identical angle with respect to the light emission zone.

In the context of the invention, a quantitative and/or qualitative determination of a sample to be measured is understood to mean the measurement of relevant parameters of the sample, wherein said parameters can be, in particular, relative quantitative ratios of a composition of the sample.

In the context of the invention, an interaction between a sample and a light beam is understood to mean, in particular, that the properties of the light emitted by the light emission zone change as a result of the sample through which the light beam passes. In this case, in particular, the light beam can be attenuated (absorption) or intensified on account of sample-specific properties. The last-mentioned alternative is based on the principle, in particular, that an excited atom of the element through which the light beam passes emits an element-specific electromagnetic radiation.

In the context of the invention, referencing is understood to mean, in particular, that undesired effects that arise as a result of an interaction between the sample to be measured and the first light beam are eliminated. Likewise, this is intended also to compensate for a lamp fluctuation of the lamp.

In other words, the present invention proposes a spectrometer which can generate or interrogate an identical reference beam with respect to the measurement beam, i.e. the two light beams, in a simple manner. As a result, in particular, lamp drift is eliminated and a high long-term stability of the spectrometer is thus achieved. Moreover as a result of such provision of the light beams and the corresponding detection devices the mirrors known from the prior art can be obviated. In this way, the spectrometer can be embodied overall with greater energy efficiency. In addition, components, i.e. in particular optical components such as mirrors, for example, can be saved or completely obviated. In comparison with devices known from the prior art, the spectrometer according to the invention does not require complex optical units or optical units of comparable complexity. The handling of the spectrometer is likewise simplified since the two light beams can now be provided simultaneously. Moreover, the switchover required from the prior art can thus be obviated. Furthermore, the lamp intensity can be automatically compensated for by the arrangement according to the invention. This effect is brought about in particular by the position of the emission zone (height of the emission location or observation zone), i.e. in particular by the identical origin of the light beams on the light emission zone or the emission at an identical height, which is imaged on the detectors. In addition, such provision of the light beams has a positive influence on the measurement signal stability by comparison with the prior art. By comparison with the traditional two-beam technique traditionally used hitherto, the arrangement according to the invention thus constitutes a very simple and efficient solution for compensating for changes in the lamp emission.

The light emission zone can be provided for emitting at least one further light beam, wherein the first light beam and the further light beam each have an origin on the light emission zone, wherein the spectrometer furthermore comprises: a further sample container for receiving a sample to be measured, said further sample container being arranged in the beam path of the further light beam, and a further detection device, which is arranged in the direction of the further light beam, for the quantitative and/or qualitative determination of the sample to be measured in the further sample container on the basis of an interaction between the sample to be measured and the further light beam.

A spectrometer according to the invention in accordance with a second aspect of the invention comprises a lamp extending in substantially tubular fashion for the purpose of forming a light emission zone extending in the direction of the tubular extent and between two points for the purpose of emitting a first light beam and a further light beam, preferably two further light beams, each having an origin (i.e. in particular having different origins) on the light emission zone. The spectrometer comprises a sample container for receiving a sample to be measured said sample container being arranged in the beam path of the first light beam, and a further sample container for receiving a sample to be measured, said further sample container being arranged in the beam path of the further light beam. In the direction of the first light beam there is arranged a first detection device for the quantitative and/or qualitative determination of the sample to be measured in the sample container on the basis of an interaction between the sample to be measured and the first light beam, and in the direction of the further light beam there is arranged a further detection device for the quantitative and/or qualitative determination of the sample to be measured in the further sample container on the basis of an interaction between the sample to be measured and the further light beam.

In other words, with the further light beam, the further sample container and the further detection device or with the spectrometer in accordance with the second aspect of the present invention, the sample to be measured in the sample containers is determined quantitatively and/or qualitatively by means of the light beams of the single lamp. The light emission zone therefore extends in such a way as thus to illuminate at least two, preferably three, sample containers, (i.e. measuring cells or cuvettes), and detection devices. Moreover, since the light beams have their origin in the same light emission zone undesired lamp drift is compensated for—in a manner similar to that in the case of the first aspect of the invention. As a result, therefore, a very space-saving spectrometer, in particular spectrometer comprising only one lamp with only one lamp power supply unit, is provided which at the same time can determine the sample to be measured quantitatively and/or qualitatively very accurately, i.e. with a particularly high quality with meaningful measurement results.

The sample containers can be fluid-technologically connected to one another, can be preferably connected in series, wherein preferably one of the sample containers has an opening for feeding in the sample to be measured from outside and another sample container has an opening for removing the sample to be measured from outside, such that the sample to be measured can be guided through the fluid-technologically connected sample containers for the purpose of the quantitative and/or qualitative determination. In this way, the sample to be measured is determined quantitatively and/or qualitatively successively in the sample containers in a simple manner. The measurement process is made more efficient as a result. Moreover, meaningful measurement results are achieved by means of the successively provided measurement of the sample in preferably two different sample containers.

The first light beam and the further light beam preferably have an identical or different origin relative to the extent of the light emission zone. In other words, it is possible to arrange the sample containers with respectively assigned detection device relative to one another in any desired manner in the light emission region (e.g. in the form of a light cone) of the light emission zone. A very flexible and at the same time space-saving arrangement of the spectrometer is thus brought about as a result.

Advantageously, the sample containers, i.e. at least the sample container and the further sample container, differ in their respective extent in a direction along the respective light beam, preferably in such a way that the extent of the further sample container in the direction of the further light beam is shorter than the extent of the sample container in the direction of the first light beam. As a result, i.e. in particular as a result of the different layer depths the interaction of the light beam with the sample to be measured in the sample container differs from the interactions of the further light beam with the sample to be measured in the further sample container. Consequently, in the detection devices, different interactions are imaged and different signals are thus generated, which can thus be used e.g. for increasing the precision of the quantitative and/or qualitative determination of the sample to be measured. The quality of the measurement by means of the spectrometer can thus be increased.

The light emission zone can be provided for emitting at least one additional light beam, wherein the further light beam and the additional light beam have the same origin on the light emission zone, and wherein the spectrometer furthermore comprises at least for one, a plurality of or all further detection devices: an additional detection device, which is arranged in the direction of the additional light beam, for referencing the quantitative and/or qualitative determination of the sample to be measured on the basis of the additional light beam, wherein preferably an additional reference container having a reference liquid is provided between the additional detection device and the lamp, and wherein the referencing of the quantitative and/or qualitative determination of the sample to be measured is effected on the basis of an interaction between the reference liquid and the additional light beam. In other words, the quantitative and/or qualitative determination of the sample to be measured in the further sample container can be referenced in a manner corresponding to the referencing in accordance with the first aspect of the invention. The advantages of the first aspect of the invention are thus correspondingly applicable to this preferred embodiment.

The sample container can be arranged between the first detection device and the lamp. Likewise, the sample containers can be arranged in each case between the respective detection device and the lamp. In other words, the sample container can be arranged between the first detection device and the lamp, the further sample container can be arranged between the further detection device and the lamp, and the additional sample container can be arranged between the additional detection device and the lamp. A highly space-saving arrangement of the spectrometer is achieved as a result.

A reference container having a reference liquid can be provided between the second detection device and the lamp. The referencing of the quantitative and/or qualitative determination of the samples to be measured can be effected in this case on the basis of an interaction between the reference liquid and the second light beam. As a result, the reference liquid makes it possible to eliminate in particular effects that arise during the interaction between the light beam and the sample to be measured or the container thereof. This is beneficial in particular to the quality of the measurements.

Preferably, the identical origin on the light emission zone is provided at a defined distance from one of the two points. In this case, a defined distance from one of the two points is understood to mean, in particular, that the identical origin does not coincide with one of the two points. The defined distance is preferably at least 1 mm, particularly preferably at least 2 mm, very particularly preferably at least 5 mm. Advantageous origins for emitting the light beams for measuring the sample result by means of the defined distance.

Preferably, the light beams, in particular the first and second light beams, and with further preference the further and additional light beams, each form an angle of 0° to 90°, particularly preferably an angle of 90° with the light emission zone. With regard to the quality of the measurement, the angles of the—that is to say these—light beams can form an arbitrary angle with the light emission zone. The reason for this is, in particular, that only the identical origin on the light emission zone is of high relevance. However, a particularly advantageous spatial configuration of the spectrometer can be achieved by means of the angular ranges mentioned above. Particularly if the angle corresponds to exactly 90°, a very compact arrangement of the respective elements can be achieved.

The light beams, in particular the first and second light beams, and preferably furthermore the further and additional light beams, can be provided in each case in a common plane, wherein the common plane preferably extends perpendicularly to the extent of the light emission zone. That is to say that preferably the light emission zone extends in the same direction as the normal vector of the common plane.

The light beams, in particular the first and second light beams, and preferably furthermore the further and additional light beams, can each form an angle which is in a range from 0° up to and including 180°. Preferably, said angle is 180°. In other words, the—that is to say these—light beams preferably extend in the same direction. Consequently, the major extent of the spectrometer can be restricted to one direction of extent. As a result, the spectrometer is optimized in particular with regard to its compactness.

The detection device can respectively comprise a detector, preferably a detector chip, and a monochromator for spectrally isolating a specific wavelength from the light beams. In this case, the monochromator can be arranged on the detector or between the detector and the lamp, i.e. e.g. upstream of the detector with reference to the lamp. In this case, the monochromator makes it possible to filter wavelengths or wavelength ranges of the light emanating from the sample which may be relevant to the quantitative and/or qualitative determination. The detector or preferably the detector chip then evaluates this light filtered by the monochromator.

The monochromators can respectively comprise a tubular diaphragm, wherein the diaphragm in each case passes through the monochromator in such a way that the diaphragm is situated with a first diaphragm opening opposite the lamp and is situated with a second diaphragm opening opposite the detector and preferably at least partly reaches around the latter. Preferably the diaphragm at least partly has the same internal diameter as the sample container preferably as the sample containers. This should be understood, in particular, such that the diaphragm can have different internal diameters.

The lamp can comprise a light-transmissive bulb, which forms the tubular shape of the lamp and additionally surrounds the light emission zone. Preferably the bulb includes a filling gas generating the light emission zone. In other words, the filling gas has physical and/or chemical properties that enable the light emission zone to be generated.

Furthermore, the spectrometer can comprise a lamp housing for emitting the light beams, said lamp housing surrounding the lamp. In other words, the spectrometer preferably comprises a lamp housing embodied in such a way that together with the lamp, i.e. in particular with the light emission zone, it can emit the light beams. In this way, the light beams can be emitted particularly simply. Preferably, the lamp housing comprises a first opening for emitting the first light beam, a second opening for emitting the second light beam and/or a further opening for emitting the further light beam and/or an additional opening for emitting the additional light beam. In this case, the first and second openings are particularly preferably provided in such a way that a first (imaginary) straight line leading through the first opening and the first detection device and a second (imaginary) straight line leading through the second opening and the second detection device intersect in the lamp and at the identical origin. The further and additional openings are preferably provided in such a way that a further (imaginary) straight line leading through the further opening and the further detection device (D3) and an additional (imaginary) straight line leading through the additional opening and the additional detection device intersect in the lamp and at the identical origin. As a result of such provision of the openings or such preferred provision of the straight lines with respect to the openings and the detection devices, the light beams can be set particularly simply and reliably, i.e. in particular reliably with respect to the identical origin.

The lamp housing can be embodied as round or polygonal. Preferably, the lamp housing is provided here in rectangular fashion.

Moreover, a connection means for connecting the sample container, preferably the sample containers, to the lamp can be provided.

In this case, the connection means can have a shape corresponding to the lamp, preferably a shape corresponding to the lamp housing, and to the respective sample container. What can advantageously be achieved as a result of the corresponding shape is that only this connection means is required for connecting the sample container to the lamp. That is to say that as a result of the corresponding shape, just the connection means can be provided for connecting the sample container to the lamp. As a result, in particular, further securing means such as e.g. screws or the like are saved.

The spectrometer can furthermore comprise a casing surrounding the respective sample container. Such a casing can be advantageous particularly if an elevated pressure, e.g. an elevated pressure of a gas, prevails in the respective sample container. Moreover, such a casing enables the sample container to be securely accommodated.

The (respective) sample container can comprise openings for feeding in and/or removing the sample to be measured from outside. In this case, "outside" should be understood, in particular, as "outside the spectrometer". Such provision of openings in the sample container makes it possible, in particular, to reduce the handling steps for providing a sample to be measured in the respective sample container. Moreover, the sample container need no longer be removed from the spectrometer. In addition, an uninterrupted measurement of a plurality of different samples can take place as a result.

It can be provided, in particular, that the opening for removing the sample of the sample container is fluid-technologically connected to the opening for feeding in the sample of the further sample container in order to guide the sample to be measured through the fluid-technologically connected sample containers for the purpose of the quantitative and/or qualitative determination. This is in turn highly advantageous for the handling steps for the quantitative and/or qualitative determination of the sample to be measured since the sample to be measured passes without interruption, that is to say continuously, from the sample container into the further sample container. Moreover, the measurement of the sample in the two sample containers can easily be automated as a result.

The lamp can be a plasma lamp, preferably a low-pressure plasma lamp or a high-pressure plasma lamp. Lamps of this type are particularly well suited to emitting the abovementioned light beams for measuring the sample.

The light emission zone can comprise at the two points in each case an electrode, for forming a light plasma as light emission zone between the electrodes. In other words, the points can be configured in such a way that a potential difference forms between the points. Preferably, the electrode is a cup electrode, that is to say a cup-shaped electrode. As a result of providing the cup electrode—in particular in comparison with known point(ed) electrodes, in which the arc is constricted toward the electrodes—taking account of the requirements of the measurement, in particular, the identical origin can be brought very close to the electrode.

The light emission zone can be provided for emitting at least two further light beams each having an origin on the light emission zone, wherein a further sample container and a further detection device are assigned to each further light beam. It is thus possible, with a single lamp, to illuminate in total at least three sample containers with respective detection device. Consequently, in particular, a highly space-saving spectrometer for measuring a multiplicity of sample containers or samples is provided.

The invention is described by way of example below, with reference to the figures, which illustrate advantageous exemplary embodiments of the invention. In the drawings.

Figure 3:
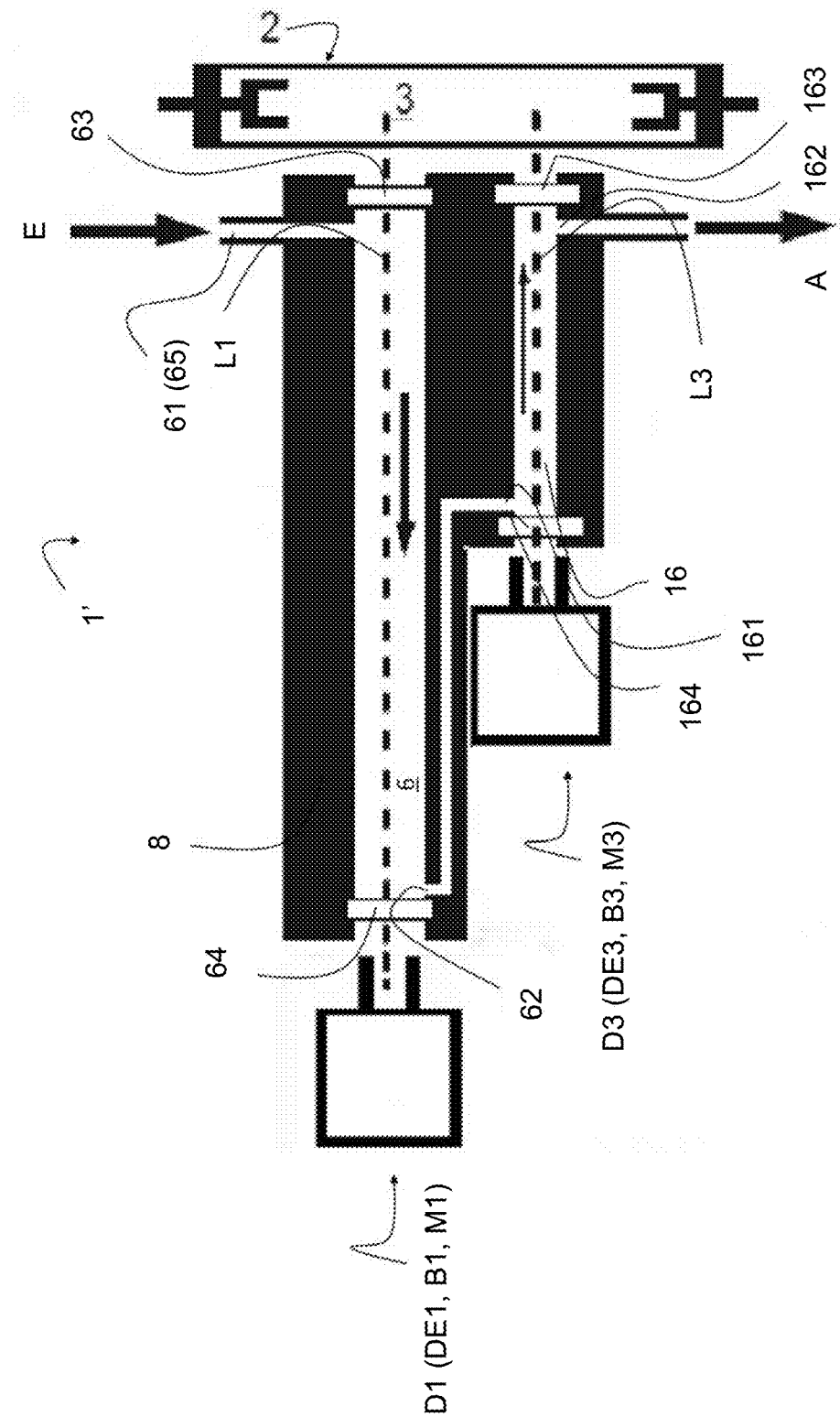
Figure 4:
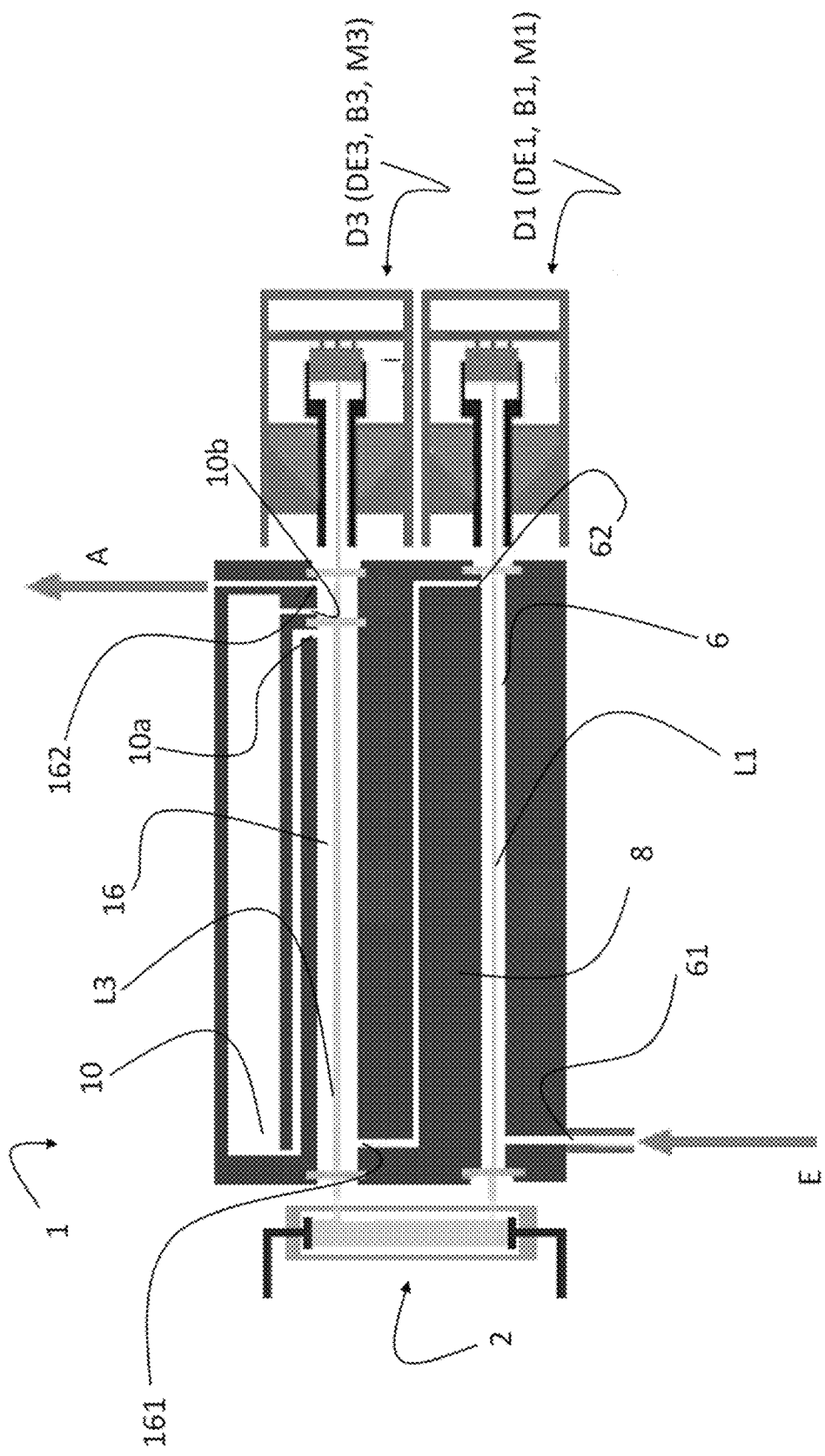

FIG. 3 schematically shows one exemplary embodiment of the spectrometer according to the invention in accordance with a further aspect of the invention; and FIG. 4 schematically shows a further exemplary embodiment of the spectrometer according to the invention in accordance with the further aspect of the invention.

Figure 1:
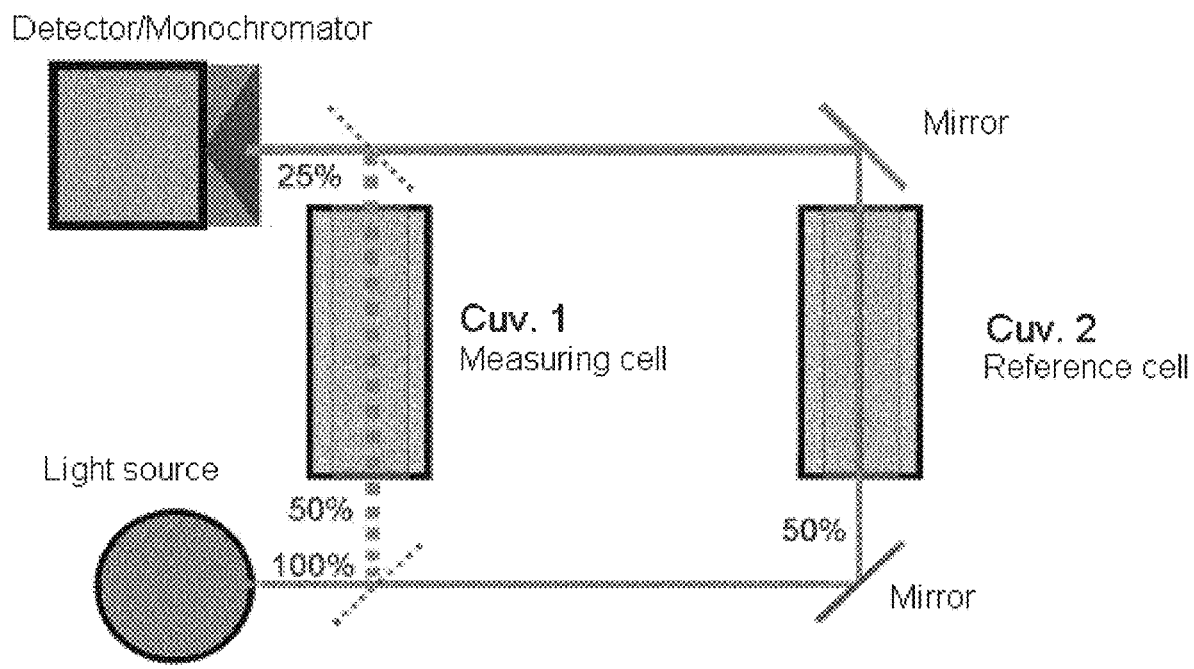
FIG. 1 shows a spectrometer known from the prior art.
Figure 2:
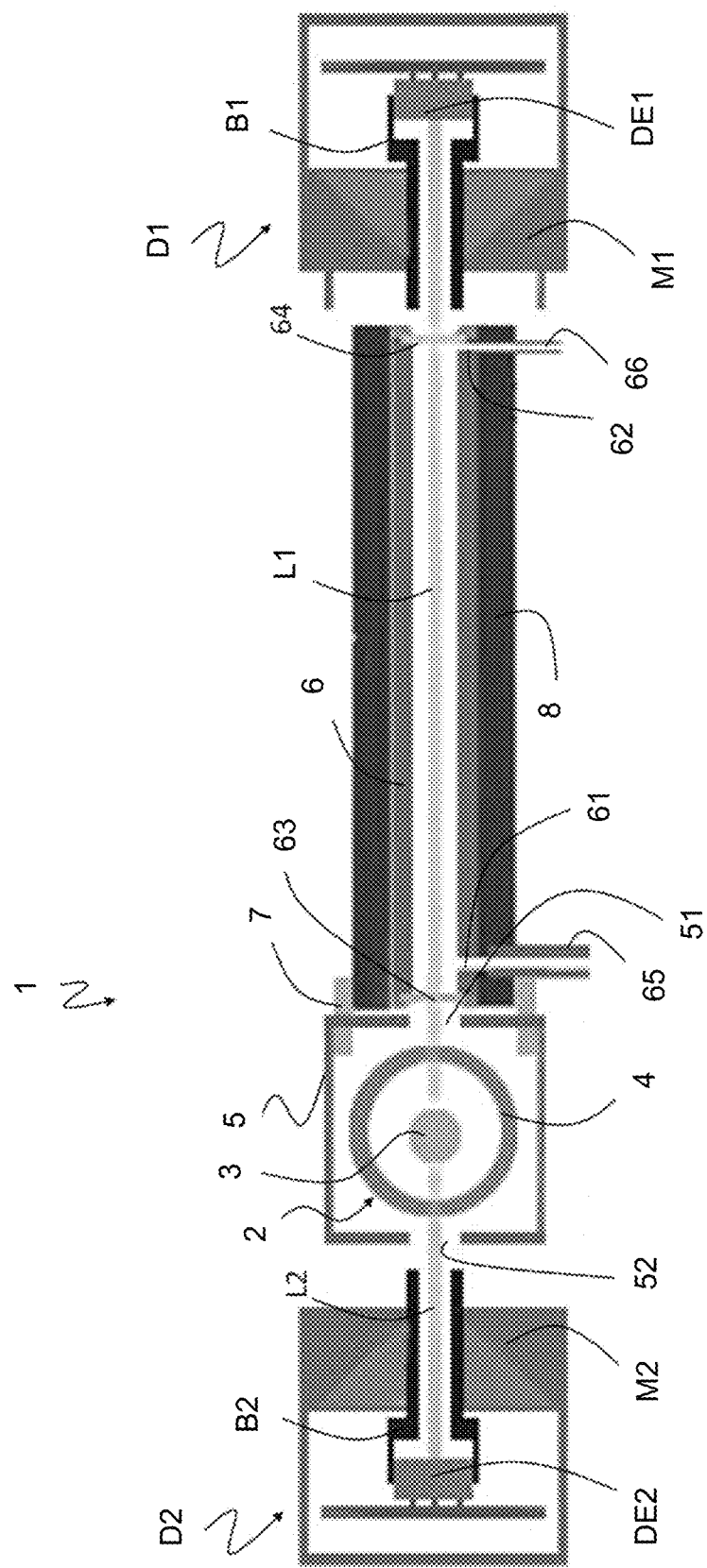
FIG. 2 shows one exemplary embodiment of the spectrometer according to the invention.

FIG. 2 shows one exemplary embodiment of a spectrometer according to the invention. The spectrometer 1 comprises a lamp 2 extending in substantially tubular fashion. In FIG. 2, here the lamp 2 extends by way of example into the plane of the drawing. In this case, tubular is not restricted to the type of cross section. In particular, any type of cross section is conceivable. Extending in tubular fashion should be understood here, in particular, such that the lamp 2 does not significantly change its cross section along its direction of extent. Advantageously, the lamp 2 has a ring-shaped cross section. However, the cross section of the lamp 2 can also have a partly circular or annular cross section or a parallelepipedal cross section. Advantageously, the lamp 2 has a ring-shaped or round cross section since with this shape only the position of the identical origin—described later—on the light emission zone 3, i.e. the position of the emission zone, is of high priority for the measurement. The lamp 2 can be a plasma lamp, preferably a low-pressure plasma lamp or a high-pressure plasma lamp.

The lamp 2 is provided for forming a light emission zone 3 in the spectrometer 1, the said light emission zone extending in the direction of the tubular extent and between two points. In FIG. 2, here the light emission zone 3 extends by way of example in punctiform fashion into the plane of the drawing. The lamp 2 can additionally comprise a light-transmissive bulb 4 forming the tubular shape and surrounding the light emission zone 3. Preferably, the bulb 4 additionally comprises a filling gas generating the light emission zone 3. In this case, such a filling gas has physical and/or chemical properties so as to generate the light emission zone 3. In this case, the light emission zone 3 can be generated by corona discharge, by way of example. Preferably, the light emission zone 3 comprises at the two points in each case an electrode, for forming a light plasma as light emission zone 3 between the electrodes. Preferably, there is a potential between the two electrodes, such that the light emission zone 3 can be formed by said potential. For this purpose, the electrodes or the two points can be connected to an external voltage source. Preferably, the electrodes are cup electrodes. That is to say that the electrodes have, in particular, a cup- or bowl-shaped form.

The lamp 2 and the light emission zone 3 emit a first light beam L1 and a second light beam L2 having an identical origin on the light emission zone 3. That is to say that the lamp 2 and light emission zone 3 are preferably fashioned in such a way that the two light beams L1 and L2 have an identical origin on the light emission zone 3. In this case, the identical origin can be provided on the light emission zone 3 at a distance relative to one of the two points. Referring to FIG. 2, said distance extends by way of example into the plane of the drawing. That is to say that the co-ordinate of the identical origin can change into and out of the plane of the drawing, but remains identical along the plane of the drawing. The identical origin can be provided on the light emission zone 3 at a defined distance from one of the two points. The defined distance is preferably at least 1 mm, particularly preferably at least 2 mm, very particularly preferably at least 5 mm. The light beams L1, L2 can each form an angle of 0° to 90° with the light emission zone 3. In other words, the light beams L1, L2 can each have an extent component which is parallel to the light emission zone 3, and an extent component which is perpendicular to the light emission zone 3. The light beams L1, L2 in this case can extend independently of one another with respect to the light emission zone 3. Preferably, at least one of the light beams L1, L2 is at an angle of 90° with respect to the light emission zone 3. Particularly preferably, both light beams L1, L2 are at an angle of 90° with respect to the light emission zone 3. In the latter case, therefore, both light beams L1, L2 extend in a common plane extending perpendicularly to the extent of the light emission zone 3. In the exemplary embodiment of FIG. 2, this is the plane of the drawing, for example, which is perpendicular to the light emission zone 3, or the normal vector of the plane of the drawing in this case corresponds to the direction of extent of the light emission zone 3. However, provision can also be made for the light beams L1, L2 to be provided in a common plane, wherein said common plane is not perpendicular to the light emission zone 3 or the direction of extent thereof. In this case, said common plane forms an angle with the plane of the drawing in FIG. 2. Said angle can be an angle of 0° to 90°.

In addition, the light beams L1, L2 can form an angle. The angle can be from 0° to 180°. Preferably, the angle, as shown by way of example in FIG. 2, is an angle of 180°. However, provision can also be a made for the angle to be 45° or 90° or 135°. FIG. 2 shows a particularly advantageous arrangement in which the common plane in which the light beams L1, L2 are provided extends perpendicularly to the extent of the light emission zone 3, and in which the light beams L1, L2 form an angle that is 180°. This arrangement results in a highly space-saving arrangement of the spectrometer.

A sample container 6 for receiving a sample to be measured is arranged in the beam path of the first light beam L1. The sample container 6 preferably has a symmetrical shape, such as e.g. a cylindrical shape. Preferably, the sample container 6 is in the form of a cuvette. The sample container 6 is preferably embodied in such a way that it can receive a gaseous and/or liquid sample. These samples can be, in particular, vapours of elements such as mercury (Hg). However, the spectrometer is generally also suitable for all other gaseous and/or liquid samples. Preferably, the direction of extent of the sample container 6 extends in the direction of the light beam L1. Preferably, an axis, particularly preferably the axis of symmetry, of the sample container 6 coincides with the light beam L1. The sample container can comprise a respective lid 63, 64 at its end and beginning. In this case, the light beam L1 preferably enters the sample container 6 through the lid 63 and emerges from the sample container 6 through the lid 64. The sample container 6 can additionally comprise openings 61, 62 for feeding in and/or removing the sample to be measured from outside. Said openings 61, 62 are advantageously provided respectively at the beginning and at the end of the sample container 6. Moreover, provision can be made for the sample container 6 to have a casing 8 surrounding the sample container 6. The casing 8 preferably has a shape corresponding to the sample container 6. In particular, provision can be made for the casing 8 to have cutouts for the openings 61, 62. Feed-in and/or removal elements 65, 66 can be provided in the cutouts, which elements can be provided in alignment with the openings 61, 62 in the casing 8. The elements 65, 66 can be connected to an external feed-in and/or removal device. The casing 8 preferably comprises a pressure-resistant material.

In the direction of the first light beam L1, provision is made of a first detection device D1 for the quantitative and/or qualitative determination of the sample to be measured in the sample container 6 on the basis of an interaction between the sample to be measured and the first light beam. In other words, if the first light beam L1 is continued conceptually, then the first detection device is situated in this conceptual continuation of the light beam L1. Depending on the type of interaction, it may also be the case that at least part of the first light beam L1 i.e. in particular an attenuated light beam, escapes in the direction of the light beam L1 and out of the sample container 6 and the detection device D1 is arranged within this part of the light beam as L1. Preferably, in this case, the sample container is arranged between the detection device D1 and the lamp 2.

In the direction of the second light beam L2, provision is made of a second detection device D2 for referencing the quantitative and/or qualitative determination of the sample to be measured on the basis of the second light beam L2. Preferably, the light beam L2 completely reaches the detection device D2, such that the detection device D2 is arranged in the second light beam L2. However, provision can also be made for only part of the light beam L2 to reach the detection device D2, and for the detection device D2 to be arranged in this part of the light beam L2.

A reference container having a reference liquid can be provided between the second detection device D2 and the lamp 2. The referencing of the quantitative and/or qualitative determination of the sample to be measured can be effected in addition or as an alternative to the referencing on the basis of the second light beam L2 on the basis of an interaction between the reference liquid and the second light beam L2. However, such a reference container is merely optional and is therefore not illustrated in the exemplary embodiment of FIG. 2 for the sake of clarity. In accordance with the embodiment having a reference container, provision can be made for the configuration and/or arrangement to be effected in accordance with the sample container 6, but instead of the sample to be measured provision is made of the reference liquid in the reference container.

The detection devices D1, D2 can each comprise a detector DE1 and DE2, respectively. The detection device D1, preferably the detector DE1 is preferably configured to ascertain, on the basis of the interaction between the sample to be measured and the first light beam L1 a characteristic, i.e. in particular a quantitative and/or qualitative characteristic, of the sample to be measured. In particular, provision can be made for the detection devices D1, D2 to be connected in each case to a computing unit, such as a computer, for example, via which the corresponding quantitative and/or qualitative results of the measurement can be read out. The detectors DE1, DE2 are in each case preferably a detector chip.

Furthermore, the detection devices D1, D2 preferably comprise a monochromator M1, M2, particularly preferably in each case in the form of an interference filter system, for spectrally isolating a specific wavelength from the light beams L1, L2. In other words, a selective spectral consideration can be achieved in each case by means of the monochromators M1, M2 which is effected by trimming unrequired spectral ranges. Preferably, the monochromators M1, M2 are in each case also connected to a computing unit, such that the computing unit can set in each case the specific wavelength which is intended to be spectrally isolated. Preferably, the computing unit is the same computing unit that is connected to the detectors DE1, DE2. In other words, it is possible to use one computing unit for all the detectors DE1, DE2 and all the monochromators M1, M2. Provision can also be made for an independent computing unit to be provided for each element. Preferably, the monochromator M1, M2 is in each case arranged on the detector or between detector DE1 or respectively DE2 and lamp 2. Provision can also be made for the monochromators M1, M2 respectively to receive and preferably enclose the detectors DE1, DE2.

As is evident from FIG. 2, the monochromators M1, M2 can respectively comprise a tubular diaphragm B1, B2, wherein the diaphragm B1, B2 in each case preferably passes through the monochromator M1, M2 in such a way that the diaphragm B1, B2 is situated with a first diaphragm opening opposite the lamp 2. In this case, a distance is preferably provided between the first diaphragm opening and the lamp 2. The second diaphragm opening can be situated opposite the detector DE or respectively the detector DE2. Preferably, the second diaphragm opening at least partly reaches around the detector DE1 or respectively DE2. Particularly preferably, the detectors DE1, DE2 are respectively received by the second diaphragm opening. The diaphragms B1, B2 particularly preferably have at least partly the same internal diameter as the sample container 6. In FIG. 2, the internal diameter of the diaphragms B1, B2 has a stepped course in each case. In accordance with this preferred embodiment, the diaphragm B1 or respectively B2 has two internal diameters, wherein one internal diameter is dimensioned in such a way that it can receive the detector DE1 or respectively DE2. In this case, the second internal diameter preferably has the same internal diameter as the sample container 6. Preferably, the diaphragms B1, B2 are embodied in each case as aperture-limiting diaphragms.

The spectrometer can furthermore comprise a lamp housing 5 for emitting the light beams L1, L2, said lamp housing surrounding the lamp 2. That is to say that the lamp housing 5 is preferably fashioned in such a way that it can generate the light beams L1, L2 or the orientation thereof. For this purpose, the lamp housing 5 can comprise a first opening 51 for emitting the first light beam L1 and a second opening 52 for emitting the second light beam L2. The openings 51, 52 are preferably provided in such a way that a first straight line leading through the first opening 51 and the first detection device D1 and a second straight line leading through the second opening 52 and the second detection device D2 intersect in the lamp 2 and at the identical origin. In other words: the first straight line preferably coincides with the first light beam L1, and the second straight line preferably coincides with the second light beam L2. In this case, the first opening 51 preferably lies between lamp 2 and detection device D2. In this case, the first opening 51 preferably lies between the sample container 6 and the lamp 2. The lamp housing 5 can be embodied as round or polygonal. Particularly preferably, as illustrated in FIG. 2, the lamp housing is embodied as rectangular. In this case, the lamp housing preferably extends at least over the direction of extent of the lamp 2.

As illustrated by way of example in FIG. 2 the spectrometer 1 can additionally comprise a connection means 7 for connecting the sample container 6 to the lamp 2. Preferably, the connection means 7 has a shape corresponding to the lamp 2 and to the sample container 6. Particularly preferably, as illustrated in FIG. 2, the corresponding shape is embodied in such a way that it corresponds to the lamp housing 5. For this purpose, the connection means 7 can be embodied in such a way that the lamp housing 5 is received on the external diameter of said connection means and the sample container 6, preferably the casing 8, in the internal diameter of the said connection means.

One exemplary method for the quantitative and/or qualitative determination of a sample to be measured in the sample container 6 will additionally be described below. For this purpose, firstly the sample to be measured is introduced in the sample container 6. In this case, the sample to be measured is generally a gas, in particular an unknown quantitative ratio of at least two gases, such as mercury, for example. The spectrometer 1 is intended here to ascertain or determine the quantitative and/or qualitative properties of said sample, i.e. in particular a quantitative ratio of specific gases. In this case, the first light beam L1 is guided through said sample to be measured. The detection device D1 disposed downstream of the sample container 6 recognizes the interaction between the sample to be measured and the first light beam L1. A computing unit connected to the detection device D1 can thereupon image the spectrum of the sample to be measured. Since said spectrum may have noise a second light beam L2, the origin of which on the light emission zone 3 is the same or identical to that of the first light beam L1, in order to have in particular the same light characteristics, is guided onto the second detection device D2. The spectrum of the second light beam L2 is thereupon likewise imaged by the second detection device D2. The two spectra can thereupon be combined in order to generate a noise-free spectrum of the sample to be measured. On the basis of said noise-free spectrum, the quantitative and/or qualitative properties of the sample to be measured i.e. in particular the quantitative ratios of the sample for example as a gas distribution curve, can thereupon be interpreted.

FIG. 3 shows one exemplary embodiment of a spectrometer 1' according to the invention in accordance with a further (second) aspect of the invention. In this case, the spectrometer 1' likewise comprises the lamp 2 extending in substantially tubular fashion for forming the light emission zone 3 extending in the direction of the tubular extent and between the points for emitting the first light beam L1. The emission of the second light beam L2 is not necessary in the case of the spectrometer 1'. Furthermore, the spectrometer 1' also comprises the sample container 6 for receiving a sample to be measured, said sample container being arranged in the beam path of the first light beam L1. In the direction of the first light beam L1, provision is furthermore made of the first detection device D1 for the quantitative and/or qualitative determination of the sample to be measured in the sample container 6 on the basis of an interaction between the sample to be measured and the first light beam L1.

The lamp 2 of the spectrometer 1' is now provided for emitting a further light beam L3 having an origin (different, that is to say other, than that of the light beam L1) on the light emission zone 3. That is to say that in this embodiment the first light beam L1 and the further light beam L3 now each have a (separate) origin on the light emission 3. However, provision can also be made for the light beams L1, L3 to have an identical or the same origin on the light emission zone 3. In this case, provision can preferably be made for the origins on the light emission zone 3 to be provided at a distance from one another. As a result, the lamp 2 or the light emission zone 3 can emit two mutually independent light beams L1 and L3 which are aligned parallel to one another and/or point in the same direction. However, provision can also be made for the light beams to point in the different directions and/or not to be aligned parallel to one another.

The lamp housing 5 described above can be provided for emitting the light beams L1, L3. In this case, provision can be made for the lamp housing 5 to comprise a further opening (not illustrated) for emitting the further light beam. In other words, the first opening 51 and the further opening are provided at a distance from one another in the direction of the extent of the light emission zone 3 (between the points) in order to emit the light beams L1, L3. However, since the origin of the light beams L1, L3 on the light emission zone 3 is not of relevance, for the sake of simplicity provision can also be made for the sample containers 6, 16 to be arranged with their respective detection device D1 and D3 respectively along one of the light beams emitted by the lamp 3.

As additionally revealed by FIG. 3, a further sample container 16 for receiving a sample to be measured is provided in the beam path of the further light beam L3. In this case, the sample container 16 is configured substantially, i.e. in particular apart from its length, like the sample container 6, and so the statements made regarding the sample container 6 are correspondingly applicable to the sample container 16. In FIG. 3, it is also discernible, in particular, that the extent of the sample container 16 in the direction along the light beam L3 differs from the extent of the sample container 6 in the direction of the light beam L1. Preferably, the extents differ here in such a way that the extent of the further sample container 16 in the direction the further light beam L3 is shorter than the extent of the sample container 6 in the direction of the first light beam L1, which entails certain advantages—which will be described in even greater detail below—with regard to the quantitative and/or qualitative determination of the sample to be measured.

The connection means 7 described above, can furthermore also connect the sample container 16 to the lamp 2. Provision can furthermore be made for a further connection means, configured in a manner corresponding to the connection means 7, to connect the sample container 16 to the lamp 2.

The casing 8 described above or a further casing provided separately for the sample container 16, said further casing being configured in a manner corresponding to the casing 8 described above, can surround the sample container 16. Preferably, the spectrometer 1' comprises a single casing 8, which surrounds the sample containers 6, 16 jointly.

The further sample container 16 can furthermore comprise a respective lid (window) 163, 164 at its end and beginning. These lids are configured substantially in a manner corresponding to the lids 63, 64, and so the statements made regarding the lids 63, 64 are correspondingly applicable to the lids 163, 164.

In the direction of the further light beam L3, provision is made of a further detection device D3 for the quantitative and/or qualitative determination of the sample to be measured in the further sample container 16 on the basis of an interaction between the sample to be measured and the further light beam L3. In this case, the detection device D3 substantially corresponds to the detection device D1 or respectively D2 described above, and so the statements made regarding the detection device D1 or respectively D3 are correspondingly applicable to the further detection device D3. That is to say, in particular, that the detection device D3 can likewise comprise a detector DE3, preferably a detector chip, and a monochromator M3. The statements made regarding the detector DE1 or respectively DE2 and regarding the monochromator M1 or respectively M2 are thus correspondingly applicable to the detector DE3 and the monochromator M3. The monochromator M3 can furthermore comprise a diaphragm B3 configured in a manner corresponding to the diaphragm B1 or respectively B2 described above.

As likewise revealed by FIG. 3, as a result of the different extent of the sample containers 6, 16, which is provided differently in particular in regard to the length, the distance between the detection devices D1, D3 and the lamp 3 can also be different. Provision can thus be made, in particular, for the detection device D3 to be arranged closer to the lamp 3 than the detection device D1.

FIG. 3 illustrates by way of example that the sample containers 6, 16 can be fluid-technologically connected to one another, such that the sample to be measured can be guided through the fluid-technologically connected sample containers 6, 16 for the purpose of the quantitative and/or qualitative determination. In this case, the sample containers 6, 16 are preferably connected in series for the purpose of providing this fluid-technological connection, such that the sample to be measured passes through the sample containers 6, 16 in turn. In order to elucidate this fluid-technological connection, FIG. 3 illustrates the arrows E (feed direction) and A (removal direction) and also the arrows illustrated in the sample containers 6, 16. Provision can be made, in particular, for the further sample container 16 likewise to be able to comprise openings 161, 162 configured in a manner corresponding to the openings 61, 62. In this case, the opening 161 is provided for feeding the sample to be measured into the sample container 16. The opening 161 is provided for example at the lower end of the sample container 16, that is to say preferably in proximity to the detection device D3. The opening 162 is provided for removing the sample to be measured from the sample container 16 and from outside. The opening 162 is provided for example at the upper end of the sample container 16, that is to say preferably in proximity to the lamp 2, i.e. closer to the lamp 2 than the opening 161. Provision can thus be made for the opening 62 to be fluid-technologically connected to the opening 161 for the purpose of the abovementioned fluid-technological connection of the first sample container 6 to the further sample container 16. For the purpose of the fluid-technological connection of the openings 62, 161, a channel connecting these openings can be provided, which channel is preferably provided or fashioned in the casing 8. A sample to be measured thus passes firstly via the opening 61 into the sample container 6 and is quantitatively and/or qualitatively determined there. After the sample to be measured has been quantitatively and/or qualitatively determined in the sample container 6, the sample to be measured passes via the opening 62 and the opening 161 into the further sample container 16, where the sample to be measured is once again determined quantitatively and/or qualitatively. This results in a particularly accurate quantitative and/or qualitative determination of the sample to be measured. This effect is additionally intensified if the sample containers 6, 16 differ in their extent along the respective light beam (see above). The arrows illustrated in FIG. 3 elucidate the course of the path of the sample to be measured through the spectrometer 1' or the sample containers 6, 16. The arrow E reveals that the sample to be measured passes via the sample container 6 or the opening 61 into the spectrometer 1' (from the outside). The arrow A reveals that the sample to be measured leaves the spectrometer 1' via the sample container 16 or the opening 162 (toward the outside).

Provision can furthermore be made of a feed-in and removal unit (not illustrated), which feeds the sample to be measured into the spectrometer 1' and removes it therefrom, in particular in such a way that the sample to be measured is quantitively and/or qualitatively determined firstly in the sample container 6 and afterward in the further sample container 16. Said unit can be a device that is provided at the opening 61 and/or the opening 162 and generates an excess and/or reduced pressure, such as a pump unit, for example. By means of the feed-in and removal unit, it is thus possible, in particular, that the sample to be measured can traverse the path indicated by the arrows (cf. FIG. 3) through the spectrometer 1', in particular through the sample containers 6, 16.

Provision can furthermore be made for the detection devices D1, D3 to be connected in each case to a computing unit, such as a computer, via which the quantitative and/or qualitative results of the measurements as determined via the detection devices D1, D3 can be read out or can be processed therein. Provision can thus be made, for example, for the computing unit to combine the quantitative and/or qualitative determinations of the detection devices D1, D3 in order thus to quantitatively and/or qualitatively determine the sample to be measured. Consequently, e.g. from the results of the detection devices D1, D3, it is possible to calculate a single result of the quantitative and/or qualitative determination, which has a very high meaningfulness or quality.

The spectrometer 1' can additionally comprise the above-described referencing unit (light beam L2 with second detection device D2 etc.) for referencing the quantitative and/or qualitative determination of the sample to be measured. In this case, therefore, the lamp 2 or the light emission zone 3 is provided, in particular, in order to emit, besides the light beams L1 and L3, an additional light beam (e.g. the light beam L2 described above; that is to say that the explanations in respect of the first and second light beams L1, L2 are correspondingly applicable to the further light beam L3 and the additional light beam) in order to reference the sample to be measured in the sample containers 6 and/or 16 on the basis of the additional light beam. The further light beam L3 and the additional light beam then have the identical origin on the light emission zone 3, wherein the spectrometer furthermore comprises at least for one, a plurality of or all further detection devices: an additional detection device, which is arranged in the direction of the additional light beam, for referencing the quantitative and/or qualitative determination of the sample to be measured on the basis of the additional light beam. Preferably, an additional reference container having a reference liquid is provided between the additional detection device and the lamp 2, and wherein the referencing of the quantitative and/or qualitative determination of the sample to be measured is effected on the basis of an interaction between the reference liquid and the additional light beam. The above-described explanations concerning the referencing of the quantitative and/or qualitative determination by means of the first light beam L1 are thus correspondingly applicable to the referencing of the quantitative and/or qualitative determination by means of the light beam L1 and/or the light beam L3.

Provision can likewise be made for the light emission zone 3 of the spectrometer 1 to be provided for emitting the further light beam L3, wherein the first light beam L1 and the further light beam L3 each have an origin on the light emission zone 3, wherein the spectrometer 1 furthermore comprises the further sample container 16, which is arranged in the beam path of the further light beam L3, for receiving a sample to be measured, and the further detection device D3, which is arranged in the direction of the further light beam L3, for the quantitative and/or qualitative determination of the sample to be measured in the further sample container 16 on the basis of an interaction between the sample to be measured and the further light beam L3.

Provision can furthermore be made for the spectrometer 1' to comprise two further sample containers, that is to say an even further sample container besides the further sample container 16. The light emission zone 3 is then provided for emitting at least two further light beams each having an origin on the light emission 3 or the even further sample container is illuminated by the lamp 2 in a manner corresponding to the sample containers 6, 16. The even further sample container thus has—like the sample containers 6, 16—a (still further) detection device. The statements made regarding the sample containers 6 and 16, respectively, the light beams L1 and L3, respectively, and the detection devices D1 and D3, respectively, are thus correspondingly applicable to this sample container with corresponding detection device. This sample container can thus in turn be fluid-technologically connected to the sample container 16 in a manner corresponding to the fluid-technological connection between sample containers 6 and 16. In other words: a sample container is fluid-technologically connected to the respective further sample container or the sample containers are fluid-technologically connected in series with one another. In this way, the abovementioned advantageous effects, i.e. in particular a high accuracy of the quantitative and/or qualitative determination of the sample to be measured, can be intensified even further.

As illustrated in FIG. 4, the spectrometer 1' can furthermore comprise a buffer container 10, which is fluid-technologically connected to the last or further sample container 16 (and/or sample container 6). In this case, the buffer container 10 brings about an increase in the volume of the sample container 16 and preferably has no outlet to outside the spectrometer 1'. The sample container 16 can be fluid-technologically connected to the buffer container 10 via preferably two openings 10a, 10b, which are provided for feeding the sample to be measured into the buffer container 10 and removing it therefrom. In this case, the buffer container 10 is fluid-technologically connected to the further sample container 16 preferably in such a way that the sample to be measured firstly passes (via the opening 161) into the sample container 16 and, after the interaction with the light beam L3 and the quantitative and/or qualitative determination, passes (via the opening 10a) into the buffer container and is buffered or temporarily stored there, and afterward passes (via the opening 10b) into the sample container 16 again. Having arrived in the sample container 16 again the sample to be measured can finally escape to outside the spectrometer 1' e.g. via the opening 162.

An exemplary method for the quantitative and/or qualitative determination of a sample to be measured in the sample containers 6, 16 or in the spectrometer 1' is intended additionally to be described below. For this purpose, firstly the sample to be measured is introduced into the sample container 6. In this case, the sample to be measured is generally a gas, in particular an unknown quantitative ratio of at least two gases, such as mercury, for example. In this case, the spectrometer 1' is intended to ascertain or determine the quantitative and/or qualitative properties of said sample, i.e. in particular a quantitative ratio of specific gases. In this case, the first light beam L1 is guided through the sample container 6 and said sample to be measured. The detection device D1 disposed downstream of the sample container 6 recognizes the interaction between the sample to be measured and the first light beam L1. A computing unit connected to the detection device D1 can thereupon image the spectrum of the sample to be measured. The sample to be measured is then introduced into the sample container 16 via the fluid-technological connection between the sample containers 6, 16. In this case, the further light beam L3 is guided through the further sample container 16 and said sample to be measured. The further detection device D3 disposed downstream of the sample container 16 recognizes the interaction between the sample to be measured and the further light beam L3. This interaction, particularly given a shorter extent of the sample container 16, can differ from the previous interaction, that is to say the interaction in the sample container 6, such that the spectrum of the sample to be measured and/or the signal of the detection device D3 likewise differ(s). A computing unit connected to the further detection device D3 can thereupon image the spectrum of the sample to be measured. The two measurements detected by the detection devices D1, D3 are thereupon combined in order to quantitatively and/or qualitatively determine the sample to be measured. In this case, the measurements can be combined e.g. on the computing unit.

In this case, the invention is not restricted to the exemplary embodiment illustrated. All features described above or features shown in the figures are advantageously combinable with one another arbitrarily within the scope of the invention. In particular, the features of the spectrometer 1 are combinable with the features of the spectrometer 1' in any advantageous way. The present invention thus proposes a spectrometer which, with a single lamp 3, can determine or ascertain quantitative and/or qualitative properties of the sample to be measured simply, in a space-saving manner and at the same time with a high quality.

The invention claimed is:

1. A spectrometer (1) comprising:
a lamp (2) extending in substantially tubular fashion for the purpose of forming a light emission zone (3) extending in the direction of the tubular extent and between two points for the purpose of emitting a first light beam (L1) and a second light beam (L2) having an identical origin on the light emission zone (3),
a sample container (6) for receiving a sample to be measured said sample container being arranged in the beam path of the first light beam (L1),
a first detection device (D1), which is arranged in the direction of the first light beam (L1), for the quantitative and/or qualitative determination of the sample to be measured in the sample container (6) on the basis of an interaction between the sample to be measured and the first light beam (L1) and
a second detection device (D2), which is arranged in the direction of the second light beam (L2), for referencing the quantitative and/or qualitative determination of the sample to be measured on the basis of the second light beam (L2)
wherein the first and second light beams (L1, L2) are provided in a common plane, and wherein the common plane extends perpendicularly to the extent of the light emission zone (3),
wherein the spectrometer (1) further comprising a lamp housing (5) for emitting the light beam (L1, L2) said lam housing (5) surrounding the lamp (2),
wherein a connection means (7) for connecting the sample container (6) to the lamp (2) is provided in such a way that the lamp housing (5) is received on the external diameter of said connection means (7) and the sample container (6) in the internal diameter of said connection means (7).

2. The spectrometer (1') as claimed in claim 1, wherein the light emission zone (3) is provided for emitting at least one further light beam (L3), wherein the first light beam (L) and the further light beam (L3) each have an origin on the light emission zone (3), wherein the spectrometer furthermore comprises:
a further sample container (16) for receiving a sample to be measured, said further sample container being arranged in the beam path of the further light beam (L3), and
a further detection device (D3), which is arranged in the direction of the further light beam (L3), for the quantitative and/or qualitative determination of the sample to be measured in the further sample container (16) on the basis of an interaction between the sample to be measured and the further light beam (L3).

3. A spectrometer (1') comprising:
a lamp (2) extending in substantially tubular fashion for the purpose of forming a light emission zone (3) extending in the direction of the tubular extent and between two points for the purpose of emitting a first light beam (L1) and at least one further light beam (L3) each having an origin on the light emission zone (3),
a sample container (6) for receiving a sample to be measured, said sample container being arranged in the beam path of the first light beam (L1),
a further sample container (16) for receiving a sample to be measured, said further sample container being arranged in the beam path of the further light beam (L3),
a first detection device (D1), which is arranged in the direction of the first light beam (L1), for the quantitative and/or qualitative determination of the sample to be measured in the sample container (6) on the basis of an interaction between the sample to be measured and the first light beam (L1) and
a further detection device (D3), which is arranged in the direction of the further light beam (L3), for the quantitative and/or qualitative determination of the sample to be measured in the further sample container (16) on the basis of an interaction between the sample to be measured and the further light beam (L3)
wherein the sample containers (6, 16) are fluid-technologically connected to one another, and wherein the sample containers (6, 16) differ in their respective extent in a direction along the respective light beam (L1, L3),
wherein the spectrometer (1) further comprising a lamp housing (5) for emitting the light beams (L1, L3) said lamp housing (5) surrounding the lamp (2),
wherein a connection means (7) for connecting the sample container (6) to the lamp (2) is provided in such a way that the lamp housing (5) is received on the external diameter of said connection means (7) and the sample container (6) in the internal diameter of said connection means (7).

4. The spectrometer (1') as claimed in claim 3, wherein the first light beam (L1) and the further light beam (L3) have an identical or different origin relative to the extent of the light emission zone (3).

5. The spectrometer (1') as claimed in claim 3, wherein the light emission zone (3) is provided for emitting at least one additional light beam, wherein the further light beam (L3) and the additional light beam have the same origin on the light emission zone (3), and wherein the spectrometer furthermore comprises at least for one, a plurality of or all further detection devices:

an additional detection device, which is arranged in the direction of the additional light beam, for referencing the quantitative and/or qualitative determination of the sample to be measured on the basis of the additional light beam.

6. The spectrometer (1, 1') as claimed in claim 3, wherein the sample container (6) is arranged between the first detection device (D1) and the lamp (2).

7. The spectrometer (1, 1') as claimed in claim 1, wherein a reference container having a reference liquid is provided between the second detection device (D2) and the lamp (2), and wherein the referencing of the quantitative and/or qualitative determination of the sample to be measured is effected on the basis of an interaction between the reference liquid and the second light beam (L2).

8. The spectrometer (1, 1') as claimed in claim 3, wherein the identical origin on the light emission zone (3) is provided at a defined distance from one of the two points.

9. The spectrometer (1, 1') as claimed in claim 3, wherein the first and second light beams (L1, L2) each form an angle of 0° to 90° with the light emission zone (3).

10. The spectrometer (1, 1') as claimed in claim 3, wherein the first and second light beams (L1, L2) form an angle, wherein the angle is between 0° and 180.

11. The spectrometer (1, 1') as claimed in claim 3, wherein the detection devices (D1, D2, D3) respectively comprise a detector (DE1, DE2, DE3) and a monochromator (M1, M2, M3) for spectrally isolating a specific wavelength from the light beams (L1, L2, L3), wherein the monochromator (M1, M2, M3) is in each case arranged on the detector or between detector (DE1, DE2, DE3) and lamp (2).

12. The spectrometer (1, 1') as claimed in claim 11, wherein the monochromators (M1, M2, M3) respectively comprise a tubular diaphragm (B1, B2, B3), wherein the diaphragm (B1, B2, B3) in each case passes through the monochromator (M1, M2, M3) in such a way that the diaphragm (B1, B2, B3) is situated with a first diaphragm opening opposite the lamp (2) and is situated with a second diaphragm opening opposite the detector (DE1, DE2, DE3).

13. The spectrometer (1, 1') as claimed in claim 3, wherein the lamp (2) comprises a light-transmissive bulb (4) forming the tubular shape and surrounding the light emission zone (3).

14. The spectrometer (1, 1') as claimed in claim 3, wherein the lamp housing (5) comprises a first opening (51) for emitting the first light beam (L1), a second opening (52) for emitting the second light beam (L2) and/or a further opening (53) for emitting the further light beam (L3) and/or an additional opening for emitting the additional light beam.

15. The spectrometer (1, 1') as claimed in claim 3, wherein the lamp housing (5) is embodied as round or polygonal.

16. The spectrometer (1, 1') as claimed in claim 3, wherein the connection means (7) has a shape corresponding to the lamp (2) and to the respective sample container (6, 16).

17. The spectrometer (1, 1') as claimed in claim 3, furthermore comprising a casing (8) surrounding the respective sample container (6, 16).

18. The spectrometer (1, 1') as claimed in claim 3, wherein the sample container (6, 16) comprises openings (61, 62; 161, 162) for feeding in and/or removing the sample to be measured from outside.

19. The spectrometer (1, 1') as claimed in claim 3, wherein the lamp (2) is a plasma lamp.

20. The spectrometer (1, 1') as claimed in claim 3, wherein the light emission zone (3) comprises at the two points in each case an electrode for forming a light plasma as light emission zone (3) between the electrodes.

21. The spectrometer (1, 1') as claimed in claim 3, wherein the light emission zone (3) is provided for emitting at least two further light beams each having an origin on the light emission zone (3), wherein a further sample container and a further detection device are assigned to each further light beam.

* * * * *